US006810417B2

(12) United States Patent
Lee (10) Patent No.: US 6,810,417 B2
(45) Date of Patent: Oct. 26, 2004

(54) CONTENT DELIVERY NETWORK SYSTEM AND METHOD FOR NETWORK CONFIGURING

(75) Inventor: Raymond Wei Man Lee, Taipei (TW)

(73) Assignee: Kin Man Lee, Kowloon (HK)

( * ) Notice: Subject to any disclaimer, the term of this patent is extended or adjusted under 35 U.S.C. 154(b) by 425 days.

(21) Appl. No.: 10/076,637

(22) Filed: Feb. 19, 2002

(65) Prior Publication Data

US 2002/0116481 A1 Aug. 22, 2002

(30) Foreign Application Priority Data

Feb. 20, 2001 (TW) ......................................... 90103746 A (51) Int. Cl.[7] .......................... G06F 15/16; G06F 13/14
(52) U.S. Cl. ...................... 709/220; 709/227; 709/238; 709/213; 709/203; 370/351; 370/400
(58) Field of Search ................................ 709/201, 203, 709/213, 217, 220, 222, 225, 227, 228, 229, 238, 239; 370/254, 329, 351, 355, 400

(56) References Cited

U.S. PATENT DOCUMENTS

| 5,490,212 | A | | 2/1996 | Lautenschlager | |
| 6,205,488 | B1 | * | 3/2001 | Casey et al. | 709/238 |
| 6,700,874 | B1 | * | 3/2004 | Takihiro et al. | 370/248 |

| 2001/0044842 | A1 | * | 11/2001 | Kawakami | 709/223 |
| 2003/0149787 | A1 | * | 8/2003 | Mangan | 709/238 |

FOREIGN PATENT DOCUMENTS

| EP | 0 955 746 | 11/1999 |
| WO | WO 98/59470 | 12/1998 |

* cited by examiner

Primary Examiner—B. James Peikari
(74) Attorney, Agent, or Firm—Bacon & Thomas PLLC (57) ABSTRACT

A content delivery network system is disclosed. The system comprises a communication network, a first network node for providing services for clients to access network, a second network node for managing hosts for network content providers and a third network node, wherein said third network node sets a default route and a VPN tunnel between the first and second network nodes, and provides a cache server at the bandwidth outlet of the first network node, said cache server stores a information content which has been requested and transmitted. When the client request an information content, the third network node searches the cache server. If the information content is found, the cache server provides said information content to the client directly. If the information content is not found, the cache server sends a request for catching the information content to the second network via the VPN tunnel, and transmits the information content to the client via the default route. The cache server records the data of the transmitted information content. The recorded data is provided to the second network node, so that the second network node can bill the network content provider accordingly.

10 Claims, 4 Drawing Sheets

Fig 1

(Prior Art)

Fig 2

(Prior Art)

CONTENT DELIVERY NETWORK SYSTEM AND METHOD FOR NETWORK CONFIGURING

BACKGROUND OF INVENTION

1. Field of Invention

The present invention relates to a content delivery network system and a building method for the same, and, more particularly, to a network system, in which the speed of content delivery over the Internet is fastened by using the characteristics of VPN (Virtual Private Network) and BGP (Border Gateway Protocol). The network system built by the present invention has the function of collecting data. The network system building method of the present invention can be utilized by general networks.

2. Description of Prior Art

For an individual and autonomous network, the building of network nodes needs private routes for accessing. Typically, an ISP (Internet Service Provider) uses the communication network provided by a telecommunication company as the medium of the network to maintain the continuity for network autonomy.

Currently, most important ISPs are located in the United States. If an ISP located in another region provides the content of a US ISP to a client, then the ISP must rent hardware and bandwidth of international communication network to use. Accordingly, for many ISPs the highest cost is the fees for using the international network bandwidth.

Figure 1:
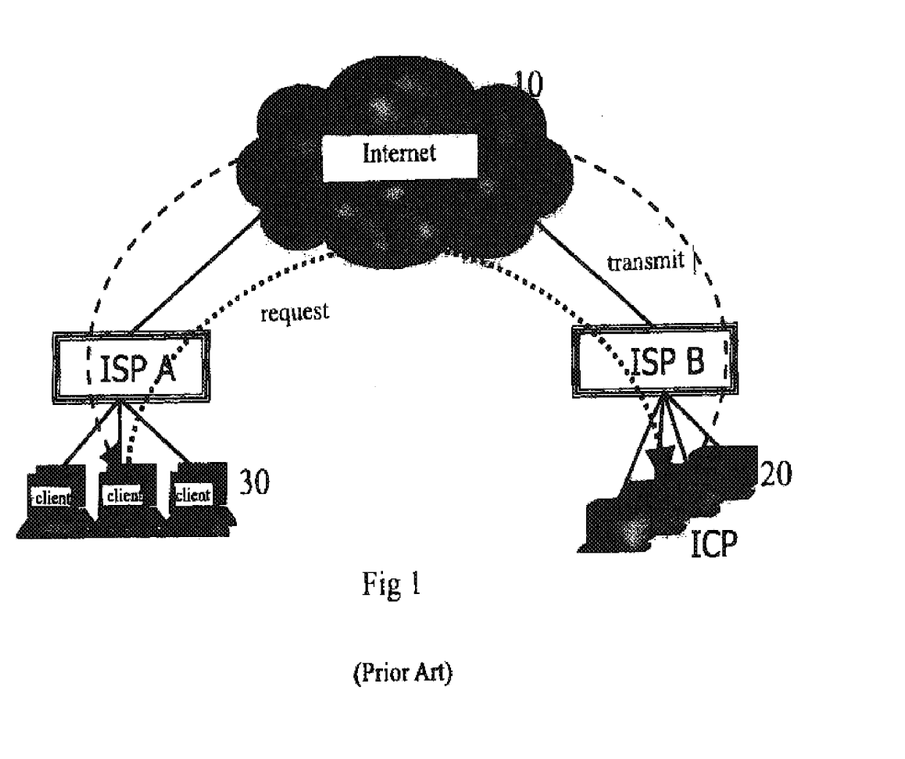
FIG. 1 is a schematic diagram showing a conventional network system for transmitting information.

Here is a simple example. Referring to FIG. 1, ISP A and ISP B are located in different locations, wherein ISP A mainly provides clients with the services of using the network, while ISP B provides ICPs (Internet Content Providers) with the services for managing the hosts. The main cost for both ISP A and ISP B is the fee for using the bandwidth to access the Internet. The income for ISP A is the fees paid by clients. Such income is constant. The income for ISP B is the bandwidth fees paid by ICPs. That is, the more people review the information provided on the hosts, the higher the income of ISP B is.

When a client of ISP A requests a certain information, ISP A sends the request to ISP B, then ISP B sends the requested information to ISP A via the internet, so that ISP A can provide the same to the client. When another client requests the same information, or the same client requests the same information again, the requesting and sending steps mentioned above are operated once more. Accordingly, the same information is transmitted over the Internet many times, which causes a waste for use of bandwidth. In addition, ISP A has to pay the fee for using bandwidth to transmit the same information again and again.

Figure 2:
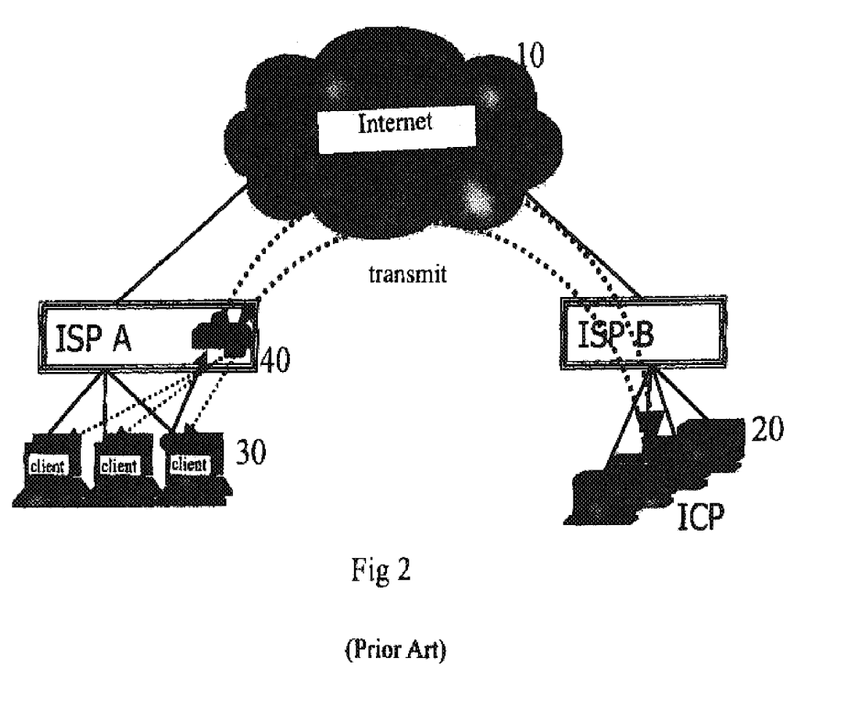
FIG. 2 is a schematic diagram showing another conventional network system for transmitting information.

Referring to FIG. 2, ISP A may set a cache server at the bandwidth outlet thereof to store the caught information contents. When an information content is requested by the client, ISP A can first search the cache server for the information. If the information is found, ISP A provides the same to the client directly. If the information is not found, then ISP A sends a request to ISP B for the required information content. By this way, the cost for ISP A can be lowered. However, such a method causes a loss to ISP B, since the number of times that ISP B needs to transmit the information contents managed for ICPs is significantly lowered. Therefore, if ISP A takes such a scheme, ISP A is in benefit conflict with other ISPs.

Therefore, solutions to solve the above problems are required. The present invention provides such a solution.

SUMMARY OF INVENTION

An objective of the present invention is to provide a content delivery network system, which can solve the continuity problem for the individual autonomous network, so as to extend the individual network. Another objective of the present invention is to provide a content delivery network system to solve the problem for site proximity, so as to ensure that the information content reaches the nearest cache server via the shortest route.

A further objective of the present invention is to provide a content delivery network system, by which the ISP providing the services for clients to access the Internet can reduce the use of international network bandwidth, thereby lowering the cost while maintaining the service quality of providing information. In addition, the income for the ISP managing the hosts will not be reduced.

Still a further objective of the present invention is to provide a billing system to calculate the fees for providing clients with information not via the international network bandwidth, so that the ISP providing the services for clients to access the Internet and the ISP managing the hosts can reasonably share the benefit from saving the cost of using bandwidth.

According to an aspect of the present invention, a content delivery network system comprises a communication network, a first network node for providing services for clients to access network, a second network node for managing hosts and a third network node, wherein said third network node sets a default route and a VPN tunnel between the first and second network nodes, and provides a cache server at the bandwidth outlet of the first network node, said cache server storing an information content which has been requested and transmitted, when the client request an information content, the third network node searches the cache server, if the information content is found, the cache server provides said information content to the client directly, if the information content is not found, the cache server sends a request for catching the information content to the second network via the VPN tunnel, and takes the information content to transmit the same to the client via the default route, and the cache server records the host data which provides the information content, the recorded data is provided to the second network node, so that the second network node can bill the owner of the host accordingly.

According to another aspect of the present invention, a method for delivering content over network comprising steps of building a communication network; building a first network node for providing clients with network accessing services; building a second network node for providing information from network content providers; setting a default route via the communication network and a VPN tunnel between the first and second network nodes, and providing, at the communication outlet of the first network node, a cache server for storing information contents transmitted from the second network node; when a client of the first network node requests a certain information content, searching the cache server and providing to the client if said information content is found; if said information content is not found, sending a request for catching said information content to the second network node; transmitting said information content via the default route by the second network node to said cache server; storing said information content and providing the same to the client; recording data of said transmitted information content and providing the recorded data to the second network node, so that the second network node can bill the network content providers.

According to a further aspect of the present invention, a method for building a content delivering network system comprising steps of building a communication network between a first network node for providing clients with network accessing services and a second network node for managing hosts; setting routes between the first and second network nodes, said routes including a default route and a VPN tunnel; establishing iBGP switching between the first and second network nodes; providing a cache server at the first network node; performing redirection to force all the communicated contents to pass said cache server; and taking required information contents from the hosts managed by the second network node and storing in said cache server for use.

According to still another aspect, in the network system of the present invention, the cache server is provided with a billing system, wherein the cache server records data of transmitted information including the traffic and the spent time of the information contents transmitted from each host to calculate the average bandwidth used amount, and the traffics of all the hosts are summed to get a sum. Said sum and the highest used bandwidth are calculated to get a factor. The maximum bandwidth used amount during a certain period is obtained by multiplying the average traffic of each host by said factor.

DETAILED DESCRIPTION OF PREFERRED EMBODIMENT

An embodiment of the present invention will be described in details with reference to the appendant drawings.

Figure 3:
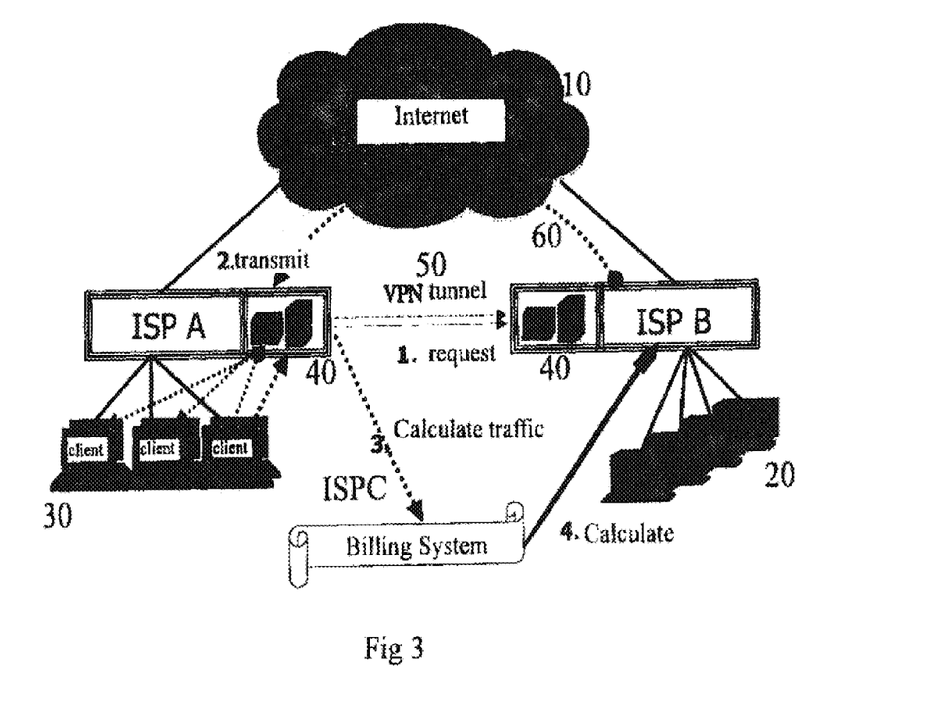
FIG. 3 is a schematic diagram showing a content delivery network system in accordance with the present invention.

Referring to FIG. 3, a content delivery system in accordance with the present invention is shown. The network system in accordance with the present invention comprises a communication network 10, which can be the Internet; an ISP (Internet Service Provider) A, which provides network accessing services and information to clients 30, an ISP B, which manages hosts for ICPs (Internet Content Providers) 20; and an ISP C providing a cache server 40 at the bandwidth outlet of ISP A.

ISP C sets a VPN tunnel 50 between ISP A and ISP B for ISP A to send a request for an information content to ISP B thereby. In response to ISP A request, ISP B transmits the required information content to ISP A via a default route 60 over the communication network 10.

The cache server 40 stores and manages the required and transmitted information contents. When ISP A receives a request for a certain information content from a client 30, ISP A searches the cache server 40 for the information content. If ISP A finds the information content from the cache server 40, ISP A transmits said information content to the client 30. If the cache server 40 does not have said information content, then ISP A sends a request to ISP B via the VPN tunnel 50. In response to said request, ISP B transmits said requested information content to ISP A via the default route 60, so that the cache server at ISP A can transmit said information content to the client, and stores and manages the same. If another client 30 requests for said information content, or the client 30 requests for said information content again, then ISP A can takes said information content from the cache server 40 and provides the same to the client without sending another request for said information content to ISP B.

It is noted that the VPN tunnel 50 can be performed by any technique capable of attaining the effect of virtual private network.

For clarity, the above embodiment is simplified to contain a single network service provider providing information to clients, ISP A, and a single network service provider managing hosts, ISP B. However, there can be a plurality of ISP As and ISP Bs.

By using such a network system, ISP A can significantly reduce the use of the bandwidth of the communication network 10, so as to lower the cost. In addition, since the number of times to transmit the same information over the communication network 10 is reduced, the waste of use of the bandwidth can be eliminated, thereby facilitating the information traffic over the communication network 10.

However, the income for ISP B is decreased since number of times that the information contents from the hosts managed by ISP B is reduced. To overcome this problem, the present invention also provides a solution.

ISP C can establish a billing system at the cache server 40. The billing system records and calculates the used bandwidth for transmitting each information content to the clients. The statistical results are provided to ISP B, so that ISP B can bill the host owners (ICPs) accordingly. By this way, the loss of ISP B can be avoided, while the cost for ISP A is significantly reduced. Furthermore, ISP C can request ISP A and ISP B to pay service fees.

Network System Building

For clarity, the following descriptions describe an example in which a network system is built between two nodes. It is appreciated that when there are more than two network nodes, the steps can be repeated and adjusted as necessary. Please refer to FIG. 4.

Step 1: Fundamental Network Building

Figure 4:
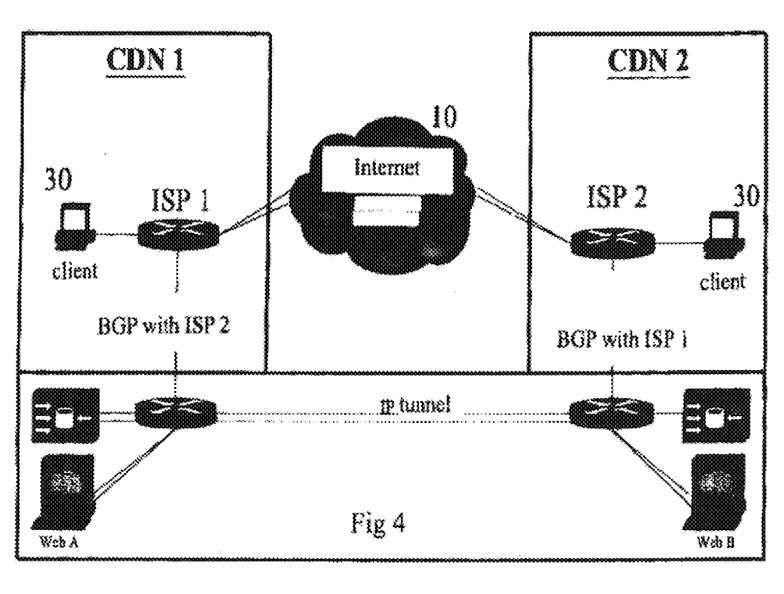
FIG. 4 shows the architecture of the content delivery network system in accordance with the present invention.

Previous preparation: Prepare an AS number of the network and an Internet IP address which can self-announce.

Two network nodes located at different locations respectively apply for connecting to the network from local ISP. The network nodes get the legal IP address and BGP switching approval from each other.

Set the data of the interface for connecting to the local ISP, BGP switching and so on. When switching BGP, it is selectable to receive the BGP full routing table, part routing table or none from the other party. However, if not the BGP full routing table is received, a default route must be added to direct to the gateway of the local ISP. Even if the BGP full routing table is received, the default route can also be established.

For the sake of convenience of description, it is assumed that two networks at different locations are CDN 1 and CDN 2. The ISPs at the two networks are ISP 1 and ISP 2, respectively. The connecting interface between CDN 1 and ISP 1 is CI1, while the connecting interface between CDN 2 and ISP 2 is CI2.

After the connection is successful and the relevant routes are established, VPN tunnel is to be set. First, set interfaces on routers of CDN 1 and CDN 2 by using loopback or directly using CI1 and CI2, for example. The IP addresses announced by AS numbers of ISP 1 and ISP 2 are IP1 and IP2, respectively. In CDN 1, IP1 is the source of the VPN tunnel and IP2 is the destination of the VPN tunnel. In CDN 2, IP2 is the source of the VPN tunnel and IP1 is the destination of the VPN tunnel. So far, the VPN tunnel is completed. It is noted that the route to the destination should pass through the network of the corresponding ISP rather than the VPN tunnel. Otherwise, a loop will occur, causing the establishment of the VPN tunnel fail. Accordingly, it may be necessary to add a static route to assign the route.

Subsequently, build IGP (Internal Gateway Protocol) or a static route by general building methods, so that the IP addresses assigned to the routers of CDN 1 and CDN 2 can assign a route to each other.

Establish iBGP (internal BGP) switching between CDN 1 and CDN 2. It is noted that the route of the local addresses switched between CDN 1 and CDN 2 must be accomplished by the VPN tunnel. A static route can be added if necessary.

Step 2: CDN (Content Delivery Network) Building

The building manner is similar to Step 1. It is noted that there is no need to switch routes other than those of the CDN network when iBGP switching. In addition, when switching routes with the local ISP, it is preferred to announce the IP address thereof rather than receive any route of the local ISP, and preferred to provide the default route. Furthermore, it is noted that the lengths of all routes announced to the ISP by the routers of CDN are the same.

In addition, set a cache server by using the IP address of the local ISP. It is preferred that said cache server uses the same subnet as the interface of the local CDN router. Establish the default route for the cache server by the gateway of the local ISP or CDN, for example.

Set redirection:
Set WCCP (Web Cache Coordinate Protocol), WCCP2 or any port redirection parameters.
Perform the fourth layer redirection by using the fourth layer switch.
Directly using the cache server as the connection access in ISP and CDN, to force all the traffic to pass the cache server. Alternatively, redirect the cacheable contents to the cache server by any possible method.

Because of the characteristic of BGP, when an ISP attempts to get the information content on CDN network, the routes are compared to select a shortest path as the route to transmit the information. Accordingly, information reaches a node on CDN network via the shortest path. Because of the effect of redirection, local cache server will resend a request to CDN for catching information. CDN transmits the request for catching information to the corresponding server via the VPN tunnel. Since the IP address of the cache server sending the request is not the IF address of the network thereof, the router will select the default route to transmit the information to the cache server, then the cache server transmits the same to the ISP sending said request for catching information, so that the ISP can provide the information to the clients.

The VPN tunnel has overhead, so the VPN tunnel can only accept the request for catching information. It is almost not possible to transmit the information contents via the VPN tunnel because of the limit of overhead. Accordingly, the information content is transmitted via the default route.

In addition, since the route for transmitting the information is not assigned, such a transmission can be performed by satellite system. The system and method according to the present invention is independent of time. Therefore, the administrator of the cache server or network system can update the information based on its data analysis.

Step 3: Taking Information Contents from ICP server

Establish a server side cache server at the network node of the CDN by using the IP address of the CDN, and establish private DNS (Domain Name Service) system by local billing system. After directing DNS of the server side cache server to the private DNS, a host request on the ISP can be firstly directed to the server side cache server by any DNS redirection or global server switching load balance techniques. Accordingly, ICP can use the CDN network without change the IP address thereof.

Step 4: Building Global Content Delivery Network System

According to the method described above, based on actual conditions, a global content delivery network system can be flexibly built.

By using the system described above, most of the information contents provided by ICPs are put in the cache server, so that the ISP managing the hosts for ICPs cannot further get the traffic fees from ICPs. However, in accordance with the present invention, a billing system can be built in the cache server. The billing system records data such as the traffic and time of the actually transmitted information and make statistic data accordingly. The record and statistic data can be provided to the ISP managing hosts for ICP, so that the ISP can bill those ICPs based on the data. Therefore, the loss to the ISP is avoided. The builder of the content delivery network system in accordance with the present invention can provide cache servers to respective ISPs and build the billing system. The traffic bandwidths can be recorded in details through the billing system. The recorded data can be arranged and provided to the respective ISPs, so that the ISP can bill the host owners (ICPs) accordingly. Since the billing is based on the actually used bandwidths, so that the fees paid by ICPs are reasonable. By using the system in accordance with the present invention, the cost of using bandwidths to transmit information can be significantly reduced. The builder of the system in accordance with the present invention can charge the ISP some service fees accordingly.

The building of the CDN system is completely based on BGP routes, which approach the physical network routes unless there are other VPN tunnels. Accordingly, the data got from the CDN have the value for reference more than those from other networks.

It is noted that although the embodiment above is described as building a content delivery network system between two network nodes, the present invention can be applied to a system having a number of network nodes.

The system in accordance with the present invention can assure that the request for information reaches the nearest cache server without changing the net page of ICP. Therefore, the CDN system of the present invention is more convenient and rapid than the traditional system in which the net page has to be changed and the content delivery is performed by using DNS description.

The method above does not limit the building manner of the network self, that is, not limiting the existing architectures, various communication protocol switchings, devices and interfaces. The present invention can be applied to global network system. Currently, there is no solution for the site proximity on the network. The proximity is performed by using DNS or hop count. The present invention can assure that the information reaches the destination via the shortest route.

Building Example

In this example, the two network nodes are HiNet in Taiwan and the AboveNet in US, respectively. The settings are as follows:

The present network AS-9836, IP-202.143.128.0/19
AboveNet: AS-6461, IP-208.185.154.0/23
HiNet: AS-3462, IP-210.71.224.0/24
Relevant settings for the Taiwan node:
clock timezone TPE 8
ip subnet-zero
ip wccp web-cache
!
interface Loopback2
ip address 202.143.129.253.255.255.255.255
ip router isis
!
interface Loopback3
ip address 210.71.224.5.255.255.255.255
!
interface Tunel1
ip address 208.185.155.6.255.255.255.252
ip directed-broadcast
ip wccp web-cache redirect out
ip router isis
tunnel source 210.71.224.5
tunnel destination 208.185.154.3
!
interface Serial1/1
description Hinet2iasp
bandwidth 1544
ip address 210.59.213.205.255.255.255.252
no ip redirects
no ip proxy-arp
encapsulation ppp
no ip route-cache
no ip mroute-cache
random-detect
no cdp enable
hold-queue 1024 in
hold-queue 1024 out
!
router isis
net 49.0001.2021.4312.9253.00
!
router bgp 9836
no synchronization
bgp log-neighbor-changes
neighbor APEXTHINET peer-group
neighbor APEXTHINET remote-as 9836
neighbor APEXTHINET update-source Loopback1
neighbor APEXTHINET version 4
neighbor APEXTHINET route-reflector-client
neighbor APEXTHINET next-hop-self
neighbor APEXTHINET filter-list 41 out
neighbor 208.185.154.2 peer-group APEXTHINET
no auto-summary
!
ip classless
ip route 0.0.0.0 0.0.0.0 Serial1/1
ip route 208.185.154.2 255.255.255.255 Tunnel 1
ip route 208.185.154.3 255.255.255.255 Serial1/1
ip as-path access-list 41 permit ^$
ip as-path access-list 41 debt.*
!
!
ip prefix-list EBGP seq 5 permit 0.0.0.0/01 e 19
Relevant setting for the US node:
clock timezone TPE 8
ip subnet-zero
ip wccp web-cache
!
interface Loopback2
ip address 202.143.129.251.255.255.255.255
ip router isis
!
interface Loopback3
ip address 208.185.154.3 255.255.255.255
!
interface Tunnel1
ip address 208.185.155.5 255.255.255.252
ip directed-broadcast
ip wccp web-cache redirect out
ip router isis
tunnel source 208.185.154.3
tunnel destination 210.71.224.5
!
router isis
net 49.0001.2021.4312.9251.00
!
router bgp 9836
no synchronization
bgp log-neighbor-changes
neighbor AboveNet peer-group
neighbor AboveNet remote-as 6461
neighbor AboveNet ebgp-multihop 3
neighbor AboveNet update-source FastEthernet0/0
neighbor AboveNet version 4
neighbor AboveNet next-hop-self
neighbor AboveNet filter-list 41 out
neighbor APEXTHINET peer-group
neighbor APEXTHINET remote-as 9836
neighbor APEXTHINET update-source Loopback1
neighbor APEXTHINET version 4
neighbor APEXTHINET next-hop-self
neighbor APEXTHINET prefix-list US in
neighbor 208.184.104.2 peer-group AboveNet
neighbor 208.184.104.3 peer-group AboveNet
neighbor 210.200.186.2 peer-group APEXTHINET
no auto-summary
!
ip classless
ip route 0.0.0.0 0.0.0.0 208.184.104.1
ip route 210.71.224.5 255.255.255.255 208.184.104.1
ip route 210.200.186.2 255.255.255.255 Tunnel1
ip as-path access-list 41 permit ^$
ip as-path access-list 41 permit ^9346$
ip as-path access-list 41 permit ^9747$
ip as-path access-list 41 deny.*
!
!
ip prefix-list US seq 5 permit 0.0.0.0/01 e 19

In addition, step 2 can be completed by building a local cache server, and filtering out the routes other than those of the network thereof in iBGP announcement.

Billing System

A current cache server can only calculate the bandwidth thereof but not distinguish the respective bandwidths used by customers (e.g. ICPs). For the Internet content provider (ICP), the meaning of the bandwidth is the maximum traffic transmitted in one second over the network, that is, the performance of the network, which is the index of satisfaction for the ICP. Nowadays, the network management system provided by ISP takes average value over 600 seconds as the basis for billing. According to the network system of the present invention, the cache server records the information transmission data of the customers, including transmission time, customer data (e.g. IP address), traffic and transmitting duration. The transmitted traffic divided by the transmitting duration is an average used bandwidth. The traffics of all customers are summed to get a sum, and said sum is compared to the actually largest bandwidth to derive a factor. Since there is no preference setting for the customers served by the cache server, it is reasonable that the maximum used bandwidth in 600 seconds (or any predetermined duration) is obtained by multiplying the average transmitted traffic of each customer by the factor. Subsequently, the used bandwidths of respective network nodes are summed. The network nodes at each location can send the relevant data to a local center to calculate a local sum, then the respective local centers provide the local sums to a general center to calculate a final sum.

While an embodiment of the present invention is illustrated and described, various modifications and improvements can be made by persons skilled in this art. The embodiment of the present invention is therefore described in an illustrative but not restrictive sense. It is intended that the present invention may not be limited to the particular forms as illustrated, and that all modifications which maintain the spirit and realm of the present invention are within the scope as defined in the appended claims.

What is claimed is:

1. A content delivery network system, comprising:
   a communication network;
   a first network node for providing network access services to clients;
   a second network node for providing information contents from network content providers, said second network node and said first network node obtaining BGP (Border Gateway Protocol) route data from each other via the communication network;
   a third network node setting a default route via said communication network, BGP route announcement and a VPN (Virtual Private Network) tunnel, and providing, at an access of the first network node, a cache server for storing information transmitted from the second network node,
   when a client of the first network node request a certain information content, the first network node searches the cache server, if the certain information content is found, the first network node provides said information content to the client, if the certain information is not found, the first network node sends a request for catching said information content to the second network node via the VPN tunnel, and the second network node transmits said information content to the first network node via the default route, so that the information content is provided to the client.

2. The network system of claim 1, wherein the second network node uses an IP address of the third network node to transmit information contents.

3. The network system of claim 1, wherein the cache server records data of transmission of the information contents, the third network node provides the recorded data to the second network node so that the second network node can bill the network content providers based thereon.

4. The network system of claim 3, wherein the cache server is built with a billing system, said recorded data include traffic and time of the transmitted information contents, the billing system calculates average used bandwidths, sums the traffics of the respective network content providers, compares the summed result to the actual highest bandwidth to calculate a factor, multiplies the average traffic of each network content provider by the factor to obtain a maximum used bandwidth during a certain period, and bills each network content provider based on the maximum used bandwidth.

5. A network content delivering method comprising steps of:
   building a communication network;
   building a first network node for providing network access services to clients;
   building a second network node for providing information from network content providers;
   the first and second network node obtaining BGP route data from each other via the communication network;
   setting a default route via the communication network, BGP route announcement and a VPN tunnel between the first and second network node and providing, at a communication access of the first network node, a cache server for storing information transmitted from the second network node;
   searching the cache server when the client of the first network node requests for a certain information content;
   transmitting said information content to the client if found, or sending a request for catching said information content to the second network node via the VPN tunnel if the information content is not found from the cache server, and transmitting the requested information content from the second network node to the cache server via the default route so as to transmit the same to the client.

6. The method of claim 5, further comprising recording data of the transmitted information content and providing the recorded data to the second network node so that the second network can bill the network content provider based thereon.

7. The method of claim 5 further comprising a step of redirection to force all communicated contents to pass the cache server.

8. The method of claim 5, wherein the step of setting routes is performed by the first and second network node taking a network address and BGP switching approval from each other.

9. The method of claim 5 further comprising a step of establishing a billing system in the cache server to record data such as traffic and time of the transmitted information and provide the recorded data to the network node so as to bill the network content providers.

10. A network managing method for a content delivery network system having a plurality of network nodes providing services of connecting network to clients and managing information contents for network content providers, said method comprising steps of:
   providing a cache server at each network node;
   setting default routes and BGP announcement between the network nodes;
   setting VPN tunnels between the network nodes;
   performing redirection to force the communication of each network node to pass the cache server provided thereto;
   when a client of one network node of the network nodes requests for a certain information content, searching in the corresponding cache server;
   providing to the client if said information content is found, or sending a request for catching said information content if said information content is not found;

transmitting said request for catching the information content to the cache server of the network node having said information content via the VPN tunnel;

transmitting the requested information content from the network node having the information content to the cache server sending the request via the default route;

recording data of the transmitted information content by the cache server;

collecting the recorded data from each cache server, and arranging the recorded data into data for the respective network nodes; and providing the arranged data to the respective network nodes so that each network node can bill the network content providers based thereon.

\* \* \* \* \*